(12) United States Patent
Tsubaki et al.

(10) Patent No.: US 10,373,763 B2
(45) Date of Patent: Aug. 6, 2019

(54) ELECTROLYTIC CAPACITOR

(71) Applicant: Panasonic Intellectual Property Management Co., Ltd., Osaka (JP)

(72) Inventors: Yuichiro Tsubaki, Kyoto (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/872,948

(22) Filed: Jan. 16, 2018

(65) Prior Publication Data

US 2018/0158619 A1    Jun. 7, 2018

Related U.S. Application Data

(63) Continuation of application No. PCT/JP2016/003443, filed on Jul. 25, 2016.

(30) Foreign Application Priority Data

Jul. 29, 2015  (JP) .................................. 2015-149120

(51) Int. Cl.
*H01G 9/035*   (2006.01)
*H01G 9/022*   (2006.01)
(Continued)

(52) U.S. Cl.
CPC ............. *H01G 9/035* (2013.01); *C08K 5/053* (2013.01); *C08K 5/092* (2013.01); *C08L 71/02* (2013.01);
(Continued)

(58) Field of Classification Search
CPC ........ H01G 9/035; H01G 9/038; H01G 11/54; H01G 11/58; H01G 11/62
(Continued)

(56) References Cited

U.S. PATENT DOCUMENTS

2012/0300368 A1*  11/2012  Matsuura ............... H01G 9/035
                                                                361/506
2015/0213962 A1    7/2015  Koseki et al.
2015/0287540 A1   10/2015  Koseki et al.

FOREIGN PATENT DOCUMENTS

JP       9-171943     6/1997
JP    2006-114540     4/2006
(Continued)

OTHER PUBLICATIONS

International Search Report of PCT application No. PCT/JP2016/003443 dated Sep. 20, 2016.
(Continued)

*Primary Examiner* — Eric W Thomas
*Assistant Examiner* — Arun Ramaswamy
(74) *Attorney, Agent, or Firm* — McDermott Will & Emery LLP (57) ABSTRACT

An electrolytic capacitor includes: an anode body having a dielectric layer; a solid electrolyte layer in contact with the dielectric layer; and an electrolytic solution. The electrolytic solution contains a solvent and a solute. The solvent contains a glycol compound. The solute contains a carboxylic acid component and a base component. A ratio of the carboxylic acid component in the solute is 200 parts by mass or more with respect to 100 parts by mass of the base component.

29 Claims, 1 Drawing Sheet

(51) Int. Cl.
*H01G 11/54* (2013.01)
*H01G 11/58* (2013.01)
*H01G 11/62* (2013.01)
*H01G 9/028* (2006.01)
*H01G 9/008* (2006.01)
*H01G 9/025* (2006.01)
*H01G 9/07* (2006.01)
*H01G 9/145* (2006.01)
*C08K 5/053* (2006.01)
*C08K 5/092* (2006.01)
*C08L 71/02* (2006.01)
*H01G 9/00* (2006.01)
*C08G 61/12* (2006.01)
*H01G 9/15* (2006.01)
*C09D 165/00* (2006.01)

(52) U.S. Cl.
CPC ........... *H01G 9/008* (2013.01); *H01G 9/0036* (2013.01); *H01G 9/025* (2013.01); *H01G 9/028* (2013.01); *H01G 9/07* (2013.01); *H01G 9/145* (2013.01); *C08G 61/126* (2013.01); *C08G 2261/1424* (2013.01); *C08G 2261/3223* (2013.01); *C09D 165/00* (2013.01); *H01G 9/15* (2013.01)

(58) Field of Classification Search
USPC ................................ 361/506, 503, 504, 505
See application file for complete search history.

(56) References Cited

FOREIGN PATENT DOCUMENTS

| | | | |
|---|---|---|---|
| JP | 2007-080888 | 3/2007 | |
| JP | 2011-114208 | 6/2011 | |
| TW | 201440102 A | 10/2014 | |
| WO | 2014/021333 | 2/2014 | |
| WO | WO-2014098006 A1 * | 6/2014 | ............. H01G 9/028 |

OTHER PUBLICATIONS

English Translation of Chinese Search Report dated Mar. 5, 2019 for the related Chinese Patent Application No. 201680043408.4.

* cited by examiner

ELECTROLYTIC CAPACITOR

RELATED APPLICATIONS

This application is a continuation of the PCT International Application No. PCT/JP2016/003443 filed on Jul. 25, 2016, which claims the benefit of foreign priority of Japanese patent application No. 2015-149120 filed on Jul. 29, 2015, the contents all of which are incorporated herein by reference.

BACKGROUND

1. Technical Field

The present disclosure relates to an electrolytic capacitor including a solid electrolyte layer and an electrolytic solution.

2. Description of the Related Art

As small-sized, large capacitance, and low ESR (Equivalent Series Resistance) capacitors, promising candidates are electrolytic capacitors including an anode body on which a dielectric layer is formed, a solid electrolyte layer formed so as to cover at least a part of the dielectric layer, and an electrolytic solution.

For the solid electrolyte layer, a n-conjugated conductive polymer is used. From a viewpoint of improving withstand voltage characteristics of the electrolytic capacitor, it has been proposed that a solvent containing ethylene glycol and γ-butyrolactone is used as an electrolytic solution (see PCT International Publication No. WO 2014/021333). In addition, it has been proposed that an antioxidant is added to an electrolytic solution for increasing a sparking voltage (see Unexamined Japanese Patent Publication No. 2006-114540).

SUMMARY

An electrolytic capacitor according to the present disclosure includes an anode body having a dielectric layer; a solid electrolyte layer in contact with the dielectric layer of the anode body; and an electrolytic solution. The electrolytic solution contains a solvent and a solute. The solvent contains a glycol compound, and the solute contains a carboxylic acid component and a base component. A ratio of the carboxylic acid component in the solute is 200 parts by mass or more with respect to 100 parts by mass of the base component.

According to the present disclosure, an electrolytic capacitor having excellent withstand voltage characteristics and heat resistance, and low ESR can be provided.

DETAILED DESCRIPTION OF EMBODIMENT

Prior to describing an exemplary embodiment of the present disclosure, problems in a conventional electrolytic capacitor are described. The electrolytic capacitor is required to have low ESR, a heat resistance and so on in addition to withstand voltage characteristics. From a viewpoint of improving voltage resistance and heat resistance, it is preferable that a solute of an electrolytic solution contains an acid, and that a glycol compound is used as a solvent of the electrolytic solution. However, when a glycol compound is used as the solvent, ESR tends to sharply increase after an elapse of a certain time under a long-term load test conducted at 100° C. or higher although low ESR is exhibited in an initial stage.

In view of the above-described problems, the present disclosure provides an electrolytic capacitor which can have excellent withstand voltage characteristics and heat resistance, and can maintain low ESR.

The electrolytic capacitor according to the present disclosure includes an anode body having a dielectric layer; a solid electrolyte layer in contact with the dielectric layer; and an electrolytic solution. The electrolytic solution contains a solvent and a solute. The solvent contains a glycol compound. The solute contains a carboxylic acid component and a base component. A ratio of the carboxylic acid component in the solute is 200 parts by mass or more with respect to 100 parts by mass of the base component.

When the solvent contains the glycol compound, orientation or crystallinity of a conductive polymer included in the solid electrolyte layer is improved. According to this, conductivity of the solid electrolyte layer is increased and thus ESR of the electrolytic capacitor is reduced. Further, contact property between the solid electrolyte layer and the dielectric layer is improved, and thus withstand voltage characteristics are also improved. The conductive polymer is considered to be swollen by the glycol compound. A swollen conductive polymer is likely to cause rearrangement, so that orientation or crystallinity of the conductive polymer is considered to be improved. In addition, it is considered that the electrolytic solution is easily held between the dielectric layer and the solid electrolyte layer, and moderate insulation quality is easily maintained by the held electrolytic solution.

When the solute contains the carboxylic acid component at a ratio of 200 parts by mass or more with respect to 100 parts by mass of the base component, ESR of the electrolytic capacitor can be kept low not only in an initial stage but also for a long period of time. It is considered that deterioration of conductivity of the solid electrolyte layer is suppressed by excessively containing the carboxylic acid component in the electrolytic solution. One of causes for deterioration of the solid electrolyte layer is considered to be dedoping of a dopant from the conductive polymer.

According to the above-described configuration, improvement of heat resistance or ripple resistance of the electrolytic capacitor can also be expected. This is because the glycol compound hardly volatilizes to outside from the electrolytic capacitor. It is considered that the glycol compound hardly passes through a sealed portion of the electrolytic capacitor, at which the electrolytic solution volatilizes.

A ratio of the carboxylic acid component may be 200 parts by mass or more, and is preferably 400 parts by mass or more, more preferably 600 parts by mass or more, still more preferably 900 parts by mass or more, with respect to 100 parts by mass of the base component. Accordingly, an effect of suppressing degradation of conductivity of the solid electrolyte layer is gradually enhanced. On the other hand, when the ratio of the carboxylic acid component is excessively large, it would be difficult to dissociate the carboxylic acid component. Therefore the ratio of the carboxylic acid component is preferably 4500 parts by mass or less with respect to 100 parts by mass of the base component.

pH of the electrolytic solution is preferably 4 or less, more preferably 3.8 or less, still more preferably 3.6 or less. When pH of the electrolytic solution is 4 or less, deterioration of the conductive polymer is further suppressed. It is normally considered that an anode body is corroded when pH of an electrolytic solution is 4 or less. However, when the above-mentioned electrolytic solution is used, corrosion of the anode body is suppressed. On the other hand, pH of the electrolytic solution is more preferably 2.0 or more.

A proportion of the glycol compound contained in the solvent is preferably 50% by mass or more, more preferably 60% by mass or more, still more preferably 70% by mass or more. When the electrolytic solution contains the glycol compound as a main solvent, an effect of reducing ESR of the electrolytic capacitor and an effect of improving heat resistance are enhanced.

The solvent may contain, for example, a sulfone compound, a lactone compound, a carbonate compound, a monohydric or tri-or-more-hydric alcohol, or the like in addition to the glycol compound. As the sulfone compound, sulfolane, dimethyl sulfoxide, diethyl sulfoxide, or the like can be used. As the lactone compound, γ-butyrolactone, γ-valerolactone, or the like can be used. As the carbonate compound, dimethyl carbonate (DMC), diethyl carbonate (DEC), ethyl methyl carbonate (EMC), ethylene carbonate (EC), propylene carbonate (PC), fluoroethylene carbonate (FEC), or the like can be used. As the alcohol, for example, glycerin can be used. These compounds may be used alone or in combination of a plurality of compounds.

Preferably, the glycol compound contains at least ethylene glycol. In addition, when the solvent contains a plurality of glycol compounds, it is preferable that ethylene glycol is a main component of the glycol compound. Ethylene glycol has low viscosity among glycol compounds, so that an excessive carboxylic acid component is easily dissolved. Further, ethylene glycol has high heat conductivity, and thus ethylene glycol is excellent for heat dissipation when a ripple current has occurred. Accordingly, ethylene glycol has a large effect of improving the heat resistance.

A proportion of ethylene glycol in the glycol compound is preferably 30% by mass or more, more preferably 50% by mass or more. And ethylene glycol may constitute 100% by mass in the glycol compound.

The glycol compound may contain, for example, diethylene glycol, triethylene glycol, propylene glycol, polyethylene glycol each of which has an average molecular weight ranging approximately from 190 to 400, inclusive, in addition to ethylene glycol. For example, 3% by mass or more and 25% by mass or less of the solvent may be constituted by polyethylene glycol that has an average molecular weight ranging from 200 to 300, inclusive. Accordingly, heat resistance of the electrolytic capacitor can be further improved.

A part of the carboxylic acid component may be derived from a salt of the carboxylic acid component and the base component. That is, a salt of the carboxylic acid component and the base component may be used as a part of the solute. By using such a salt, an effect of improving a degree of dissociation of the carboxylic acid component is obtained. For example, it is preferable that 10% by mass or more and 50% by mass or less of the carboxylic acid component is derived from a salt of the carboxylic acid component and the base component.

The base component is preferably at least one selected from the group consisting of a primary amine, a secondary amine, and a tertiary amine. By using an amine component, particularly primary to tertiary amine, an effect of stabilizing ESR for a long period of time is enhanced. A quaternary amine may be used, but in view of suppressing a sub-reaction as much as possible, primary to tertiary amines, which are moderately basic, are preferable. As each of the amines, it is possible to use an aliphatic amine, an aromatic amine, and a heterocyclic amine. However, an aliphatic amine that has a molecular weight ranging from 72 to 102, inclusive, is preferable because such an aliphatic amine has a high degree of dissociation.

Examples of the primary to tertiary amine include methyl amine, dimethyl amine, trimethyl amine, ethyl amine, diethyl amine, triethyl amine, ethylene diamine, N,N-diisopropylethyl amine, tetramethylethylene diamine, hexamethylene diamine, spermidine, spermine, amantadine, aniline, phenethylamine, toluidine, pyrrolidine, piperidine, piperazine, morpholine, imidazole, pyridine, pyridazine, pyrimidine, pyrazine, and 4-dimethylaminopyridine. These amines may be used alone or in combination of two or more polyanions. Among these amines, particularly preferred are tertiary amines such as triethyl amine and monoethyldimethyl amine.

The solute may further contain an aromatic compound having two or more hydroxyl groups (first aromatic compound). The hydroxyl group of the first aromatic compound has an effect of stabilizing the conductive polymer by supplementing an action of the carboxylic acid component. Such a stabilizing effect may be associated with the fact that the hydroxyl group of the first aromatic compound is weakly acidic. In addition, the hydroxyl group of the first aromatic compound is stable, so that a sub-reaction such as an esterification reaction hardly proceeds. The hydroxyl group of the first aromatic compound exhibits an effect of stabilizing the conductive polymer over a long period of time.

An aromatic ring of the first aromatic compound is preferably a C6 benzene ring or a C10 naphthalene ring in view of suppressing an increase in viscosity of the electrolytic solution. In addition, it is preferable that the first aromatic compound has two or more phenolic hydroxyl groups bonded directly to the aromatic ring in view of securing long-term stability. Among these compounds, divalent phenolic compound to tetravalent phenolic compound are preferable. More specifically, it is more preferable that at least one selected from the group consisting of catechol and pyrogallol is used as the first aromatic compound. Especially, pyrogallol is preferable because it is moderately acidic, and it is preferable that 90% by mass or more of the first aromatic compound is constituted by pyrogallol.

Preferably, the carboxylic acid component includes an aromatic compound having two or more carboxyl groups (second aromatic compound). The carboxyl group of the second aromatic compound is stable, so that a sub-reaction hardly proceeds. The hydroxyl group of the first aromatic compound exhibits an effect of stabilizing the conductive polymer over a long period of time. The second aromatic compound is moderately acidic in the electrolytic solution, so that the anode body is less likely damaged by corrosion.

An aromatic ring of the second aromatic compound is preferably a C6 benzene ring or a C10 naphthalene ring in view of suppressing an increase in viscosity of the electrolytic solution. In addition, the second aromatic compound is preferably divalent carboxylic acid to tetravalent carboxylic acid because it is moderately acidic. More preferably, the second aromatic compound has at least two carboxyl groups bonded directly to an ortho-position of the aromatic ring because the carboxyl group is easily stabilized. More specifically, it is more preferable that at least one selected from the group consisting of o-phthalic acid and pyromellitic acid is used as the second aromatic compound. Especially, in view of exhibiting an effect of stabilizing the conductive polymer over a longer period of time, o-phthalic acid is preferable because the carboxyl group is easily stabilized. And it is preferable that 90% by mass of the second aromatic compound is constituted by o-phthalic acid.

A proportion of the solute contained in the electrolytic solution preferably ranges from 2% by mass to 30% by mass, inclusive, more preferably from 10% by mass to 30% by mass, inclusive, still more preferably from 15% by mass to 30% by mass, inclusive. This makes it possible to include an excessive carbonic acid component while moderately including a base component effective for dissociation of the carboxylic acid component. When the proportion of the solute is in the above-mentioned range, an increase in viscosity of the electrolytic solution is small, and reduction of a voltage is hardly occurred. For example, a total proportion of the carboxylic acid component (or second aromatic compound), the base component, and the first aromatic compound preferably ranges from 2% by mass to 30% by mass, inclusive, more preferably from 10% by mass to 30% by mass, inclusive, still more preferably from 15% by mass to 30% by mass, inclusive, in the electrolytic solution.

In view of further improving heat resistance of the electrolytic capacitor, and further suppressing deterioration of the solid electrolyte layer, a proportion of the first aromatic compound having two or more hydroxyl groups preferably ranges from 0.3% by mass to 70% by mass, inclusive, more preferably from 3% by mass to 40% by mass, inclusive, still more preferably from 3% by mass to 25% by mass, inclusive, in the total of the solute.

In view of further suppressing deterioration of the solid electrolyte layer, a proportion of the second aromatic compound having two or more carboxyl groups preferably ranges from 3% by mass to 99% by mass, inclusive, more preferably from 50% by mass to 95% by mass, inclusive, still more preferably from 70% by mass to 95% by mass, inclusive, in the total of the solute.

The solid electrolyte layer may be formed by a method for applying a solution containing, for example, a monomer, a dopant, and an oxidant to the dielectric layer to cause chemical polymerization or electrolytic polymerization on the dielectric layer. The solid electrolyte layer is preferably formed by a method for applying the conductive polymer to the dielectric layer in terms of the fact that excellent withstand voltage characteristics can be expected. That is, the solid electrolyte layer is preferably formed by impregnating the dielectric layer with a polymer dispersion containing a liquid component and the conductive polymer dispersed in the liquid component, forming a film that covers at least a part of the dielectric layer, and then volatilizing the liquid component from the film. The electrolytic solution described above is particularly effective for suppressing deterioration of the conductive polymer contained in the polymer dispersion, and is also effective for improving the orientation of the conductive polymer.

A concentration of the conductive polymer contained in the polymer dispersion preferably ranges from 0.5% by mass to 10% by mass, inclusive. For example, an average particle diameter D50 of the conductive polymer preferably ranges from 0.01 µm to 0.5 µm, inclusive. Here, the average particle diameter D50 is a median diameter in a volume particle size distribution obtained by a particle size distribution measuring apparatus according to dynamic light scattering. The polymer dispersion having such a concentration is suitable for forming a solid electrolyte layer having an appropriate thickness and is easily impregnated into the dielectric layer.

The conductive polymer included in the solid electrolyte layer is preferably, for example, polypyrrole, polythiophene, or polyaniline. These conductive polymers may be used alone or in combination of two or more conductive polymers, or may be a copolymer of two or more monomers. The solid electrolyte layer including such a conductive polymer can be expected to further improve the withstand voltage characteristics.

In the present specification, polypyrrole, polythiophene, polyaniline, or the like means a polymer having, as a basic skeleton, polypyrrole, polythiophene, polyaniline, or the like, respectively. Therefore, polypyrrole, polythiophene, polyaniline, or the like also include derivatives of polypyrrole, polythiophene, polyaniline, or the like, respectively. For example, polythiophene includes poly(3,4-ethylenedioxythiophene) (PEDOT) or the like.

A weight average molecular weight of the conductive polymer is not particularly limited and ranges, for example, from 1000 to 100000, inclusive.

A dopant may be added to the conductive polymer. That is, the solid electrolyte layer may contain a dopant, and in view of suppressing the dedoping of a dopant from the conductive polymer, it is preferable that the solid electrolyte layer contains a polymer dopant. Examples of the polymer dopant include a polyanion of, for example, polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These polyanions may be used alone or in combination of two or more polyanions. These polymer dopants may be a homopolymer or a copolymer of two or more monomers. Especially, polystyrenesulfonic acid (PSS) is preferable.

A weight average molecular weight of the dopant is not particularly limited and preferably ranges, for example, from 1000 to 100000, inclusive, in terms of facilitating formation of a homogeneous solid electrolyte layer.

Hereinafter, the present disclosure is more specifically described with reference to the exemplary embodiment. The exemplary embodiment described below, however, is not to limit the present disclosure.

Figure 1:
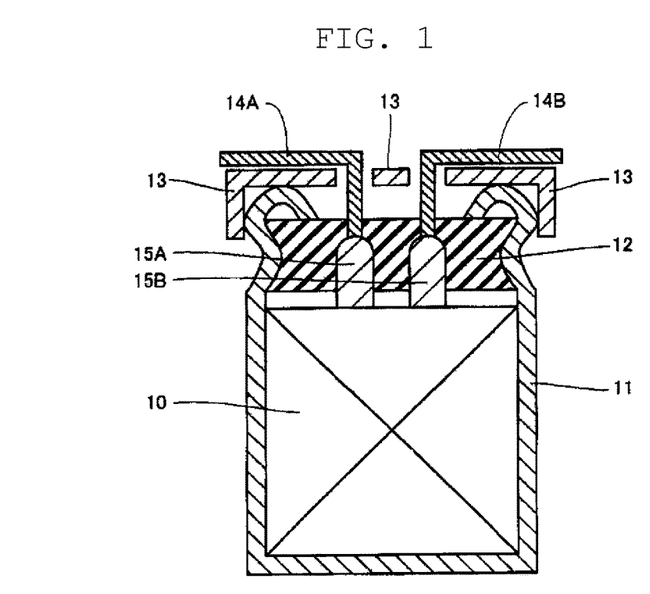
FIG. 1 is a schematic sectional view illustrating an electrolytic capacitor according to one exemplary embodiment of the present disclosure.
Figure 2:
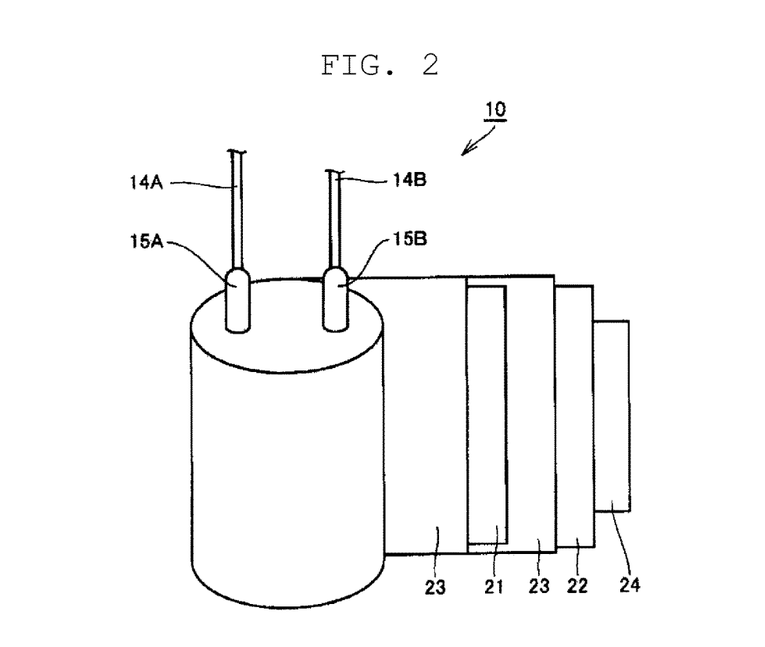
FIG. 2 is a schematic view for explaining a configuration of a capacitor element according to the present exemplary embodiment.

FIG. 1 is a schematic sectional view illustrating the electrolytic capacitor according to the present exemplary embodiment, and FIG. 2 is a schematic view obtained by developing a part of a capacitor element of the electrolytic capacitor.

The electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are lead out from sealing member 12 and penetrate base plate 13, lead tabs 15A, 15B that connect the lead wires to electrodes of capacitor element 10, respectively, and an electrolytic solution (not shown). Bottomed case 11 is, at a part near an opening end, processed inward by drawing, and is, at the opening end, curled to swage sealing member 12.

Sealing member 12 is formed of an elastic material containing a rubber component. As the rubber component, there can be used a butyl rubber (IIR), a nitrile rubber (NBR), an ethylene propylene rubber, an ethylene propylene diene rubber (EPDM), a chloroprene rubber (CR), an isoprene rubber (IR), a Hypalon (trademark) rubber, a silicone rubber, and a fluorine-containing rubber. Sealing member 12 may contain fillers such as carbon black and silica.

In design of the electrolytic solution, it is necessary to consider volatilization of the electrolytic solution to outside through sealing member 12 that forms a sealed portion. In this respect, the electrolytic solution according to the present exemplary embodiment contains the glycol compound, and therefore hardly passes through the sealed portion even at a high temperature. Accordingly, an electrolytic capacitor having excellent heat resistance is obtained.

Capacitor element 10 is formed of a wound body as illustrated in FIG. 2. The wound body is a semi-manufactured product of capacitor element 10 and refers to a capacitor element in which a solid electrolyte layer has not yet been formed between anode body 21 on a surface of which a dielectric layer is provided and cathode body 22. The wound body includes anode body 21 connected to lead tab 15A, cathode body 22 connected to lead tab 15B, and separator 23.

Anode body 21 and cathode body 22 are wound with separator 23 interposed between anode body 21 and cathode body 22. An outermost periphery of the wound body is fixed with fastening tape 24. FIG. 2 shows partially developed wound body before the outermost periphery of the wound body is fixed.

Anode body 21 includes a metal foil whose surface is roughened so as to have projections and recesses, and the dielectric layer is formed on the metal foil having the projections and recesses. The conductive polymer is attached to at least a part of a surface of the dielectric layer to form the solid electrolyte layer. The solid electrolyte layer may cover at least a part of a surface of cathode body 22 and/or at least a part of a surface of separator 23. Capacitor element 10 in which the solid electrolyte layer has been formed is housed in an outer case together with the electrolytic solution.

<<Method for Producing Electrolytic Capacitor>>

Hereinafter, described are steps of one exemplary method for producing the electrolytic capacitor according to the present exemplary embodiment.

(i) Step of Preparing Anode Body 21 Having Dielectric Layer

First, a metal foil as a raw material for anode body 21 is prepared. A type of the metal is not particularly limited, but it is preferred to use a valve metal such as aluminum, tantalum, or niobium, or an alloy including a valve metal, from the viewpoint of facilitating formation of the dielectric layer.

Next, a surface of the metal foil is roughened. By the roughening, a plurality of projections and recesses are formed on the surface of the metal foil. The roughening is preferably performed by etching the metal foil. The etching may be performed by, for example, a direct-current electrolytic method or an alternating-current electrolytic method.

Next, a dielectric layer is formed on the roughened surface of the metal foil. A method for forming the dielectric layer is not particularly limited, and the dielectric layer can be formed by subjecting the metal foil to an anodizing treatment. The anodizing treatment is performed by, for example, immersing the metal foil in an anodizing solution such as an ammonium adipate solution followed by a heat treatment. The anodizing treatment may also be performed by applying a voltage to the metal foil that has been immersed in the anodizing solution.

Normally, a large foil of, for example, a valve metal (metal foil) is subjected to the roughening treatment and the anodizing treatment from the viewpoint of mass productivity. In this case, the treated foil is cut into a desired size to prepare anode body 21.

(ii) Step of Preparing Cathode Body 22

A metal foil can be used for cathode body 22 as with the anode body. A type of the metal is not particularly limited, but it is preferred to use a valve metal such as aluminum, tantalum, or niobium, or an alloy including a valve metal. A surface of cathode body 22 may also be roughened as necessary.

(iii) Manufacturing of Wound Body

Next, anode body 21 and cathode body 22 are used to manufacture a wound body.

First, anode body 21 and cathode body 22 are wound with separator 23 interposed between anode body 21 and cathode body 22. At this time, winding can be conducted while lead tabs 15A, 15B are rolled in anode body 21, cathode body 22, and separator 23, to cause lead tabs 15A, 15B to stand up from the wound body as illustrated in FIG. 2.

As a material for separator 23, a nonwoven fabric can be used that includes, as a main component, for example, synthetic cellulose, polyethylene terephthalate, a vinylon, or an aramid fiber.

A material for lead tabs 15A, 15B is not also particularly limited as long as the material is a conductive material. A material for lead wires 14A, 14B connected to lead tabs 15A, 15B, respectively, is not also particularly limited as long as the material is a conductive material.

Next, fastening tape 24 is disposed on an outer surface of cathode body 22 positioned at an outermost layer of wound anode body 21, cathode body 22, and separator 23, to fix an end of cathode body 22 with fastening tape 24. When anode body 21 is prepared by cutting a large metal foil, the wound body may further be subjected to an anodizing treatment in order to provide a dielectric layer on a cutting surface of anode body 21.

(iv) Step of Forming Capacitor Element 10

Next, the dielectric layer is impregnated with a polymer dispersion to form a film covering at least a part of the dielectric layer. The polymer dispersion contains a liquid component and a conductive polymer dispersed in the liquid component. The polymer dispersion may be a solution obtained by dissolving the conductive polymer in the liquid component, or a dispersion liquid obtained by dispersing particles of the conductive polymer in the liquid component. Next, the formed film is dried to volatilize the liquid component from the film, forming a dense solid electrolyte layer covering at least a part of the dielectric layer. The polymer dispersion is uniformly distributed in the liquid component to easily form a uniform solid electrolyte layer. Thus, capacitor element 10 can be obtained.

The polymer dispersion can be obtained by, for example, a method for dispersing the conductive polymer in the liquid component. Or the polymer dispersion can also be obtained by a method for polymerizing a precursor monomer in the liquid component and generating particles of the conductive polymer. Preferable examples of the polymer dispersion include poly(3,4-ethylenedioxythiophene) (PEDOT) doped with polystyrenesulfonic acid (PSS), i.e., PEDOT/PSS. An antioxidant for the conductive polymer may be added. However, it is unnecessary to use an antioxidant because PEDOT/PSS little oxidizes.

The liquid component may be water, a mixture of water and a nonaqueous solvent, or a nonaqueous solvent. The nonaqueous solvent is not particularly limited, and a protic solvent and an aprotic solvent can be used, for example. Examples of the protic solvent include alcohols such as methanol, ethanol, propanol, butanol, ethylene glycol, and propylene glycol, formaldehyde, and ethers such as 1,4-dioxane. Examples of the aprotic solvent include amides such as N-methylacetamide, N, N-dimethylformamide, and N-methyl-2-pyrrolidone, esters such as methyl acetate, and ketones such as methyl ethyl ketone.

The method for applying the polymer dispersion to a surface of the dielectric layer is preferably a method for immersing the wound body in the polymer dispersion housed in a container because the method is simple. An immersion period depends on a size of the wound body, but ranges, for example, from 1 second to 5 hours, inclusive, preferably from 1 minute to 30 minutes, inclusive. In addition, impregnation is preferably performed under a reduced pressure, in a pressure of an atmosphere ranging, for example, from 10 kPa to 100 kPa, inclusive, preferably from 40 kPa to 100 kPa, inclusive. Further, ultrasonic vibration may be applied to the wound body or the polymer dispersion while the wound body is immersed in the polymer dispersion. The drying after picking the wound body up from the polymer dispersion is performed at a temperature ranging preferably from 50° C. to 300° C., inclusive, more preferably from 100° C. to 200° C., inclusive, for example.

The step of applying the polymer dispersion to the surface of the dielectric layer and the step of drying the wound body may be repeated two or more times. These steps can be performed a plurality of times to increase coverage of the solid electrolyte layer on the dielectric layer. In the formation, the solid electrolyte layer may be formed on not only a surface of the dielectric layer but also surfaces of cathode body 22 and separator 23.

As described above, the solid electrolyte layer is formed between anode body 21 and cathode body 22 to manufacture capacitor element 10. The solid electrolyte layer formed on the surface of the dielectric layer virtually functions as a cathode material.

(v) Step of Impregnating Capacitor Element 10 with Electrolytic Solution

Next, capacitor element 10 is impregnated with an electrolytic solution. This provides an electrolytic capacitor excellent in a repairing function of a dielectric layer. A method for impregnating capacitor element 10 with an electrolytic solution is not particularly limited. For example, a method for immersing capacitor element 10 in the electrolytic solution housed in a container is simple and preferred. An immersion period depends on a size of capacitor element 10, and ranges, for example, from 1 second to 5 minutes, inclusive. Impregnation is preferably performed under a reduced pressure, in a pressure of an atmosphere ranging, for example, from 10 kPa to 100 kPa, inclusive, preferably from 40 kPa to 100 kPa, inclusive.

(iv) Step of Encapsulating Capacitor Element

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or alloys of these metals.

Next, sealing member 12 formed so as to allow lead wires 14A, 14B to penetrate the sealing member is disposed above capacitor element 10 to encapsulate capacitor element 10 in bottomed case 11. Next, bottomed case 11 is, at a part near an opening end, processed by transverse drawing, and is, at the opening end, curled to swage sealing member 12. Then, base plate 13 is disposed on a curled part of the bottomed case to complete the electrolytic capacitor as illustrated in FIG. 1. Then, an aging treatment may be performed while a rated voltage is applied.

In the exemplary embodiment described above, a wound electrolytic capacitor has been described. The application range of the present disclosure, however, is not limited to the wound electrolytic capacitor and can also be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is described in more detail with reference to examples. The present disclosure, however, is not limited to the examples.

Example 1

In the present example, a wound electrolytic capacitor (Φ 10.0 mm×L (length) 10.0 mm) having a rated voltage of 80 V and a rated electrostatic capacity of 38 µF was manufactured. Hereinafter, a specific method for producing the electrolytic capacitor is described.

(Preparation of Anode Body)

A 100-µm-thick aluminum foil was subjected to etching to roughen a surface of the aluminum foil. Then, a dielectric layer was formed on the surface of the aluminum foil by an anodizing treatment. The anodizing treatment was performed by immersing the aluminum foil in an ammonium adipate solution and applying a voltage of 150 V to the aluminum foil. Then, the aluminum foil was cut into a size of 6 mm (length)×120 mm (width) to prepare an anode body.

(Preparation of Cathode Body)

A 50-µm-thick aluminum foil was subjected to etching to roughen a surface of the aluminum foil. Then, the aluminum foil was cut into a size of 6 mm (length)×120 mm (width) to prepare a cathode body.

(Manufacturing of Wound Body)

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. Ends of the lead tabs protruding from the wound body were connected to an anode lead wire and a cathode lead wire, respectively. Then, the manufactured wound body was subjected to an anodizing treatment again to form a dielectric layer at a cutting end of the anode body. Next, an end of an outer surface of the wound body was fixed with a fastening tape to complete the wound body.

(Preparation of Polymer Dispersion)

A mixed solution was prepared by dissolving 3,4-ethylenedioxythiophene and a polymer dopant, i.e., polystyrenesulfonic acid (PSS, weight average molecular weight 100000) in ion-exchanged water (liquid component). While the mixed solution was stirred, iron (III) sulfate (oxidant) that had been dissolved in ion-exchanged water was added to the mixed solution to cause a polymerization reaction. After the reaction, a resultant reaction solution was dialyzed to remove unreacted monomers and an excessive oxidant, so that a polymer dispersion was obtained that contained about 5% by mass of polyethylene dioxythiophene doped with PSS (PEDOT/PSS).

(Formation of Solid Electrolyte Layer)

The wound body was immersed in the polymer dispersion housed in a predetermined container in a reduced-pressure atmosphere (40 kPa) for 5 minutes, and then the wound body was picked up from the polymer dispersion. Next, the wound body that had been impregnated with the polymer dispersion was dried in a drying furnace at 150° C. for 20 minutes to form a solid electrolyte layer covering at least a part of the dielectric layer.

(Impregnation with Electrolytic Solution)

An electrolytic solution containing ethylene glycol (EG) and polyethylene glycol (PEG) with an average molecular weight of about 300 as glycol compounds, which has a composition as shown in Table A below, was prepared. And then a capacitor element was immersed in the electrolytic solution in a reduced-pressure atmosphere (40 kPa) for 5 minutes.

A part of the carboxylic acid component and the base component (triethylamine) were added as triethylamine phthalate (salt).

TABLE A

| Solvent component | Proportion in solvent |
| --- | --- |
| EG | 80% by mass |
| PEG | 20% by mass |
| Total of solvent component | 100% by mass |
| Proportion of glycol compound in whole solvent | 100% by mass |
| Proportion of EG in glycol compound | 80% by mass |
| Proportion of PEG in glycol compound | 20% by mass |

| Solute component | Proportion of solute contained in electrolytic solution |
| --- | --- |
| Triethylamine | 1.1% by mass |
| o-phthalic acid (second aromatic compound) | 13.9% by mass |
| Pyrogallol (first aromatic compound) | 3% by mass |
| Total of solute component | 18% by mass |
| Proportion of base component in whole solute | 6.1% by mass |
| Proportion of first aromatic compound in whole solute | 16.7% by mass |
| Proportion of second aromatic compound in whole solute | 77.2% by mass |
| Ratio of carboxylic acid component with respect to 100 parts by mass of base component | 1266 parts by mass |
| pH of electrolytic solution | 3.50 |

(Encapsulation of Capacitor Element)

The capacitor element that had been impregnated with the electrolytic solution was encapsulated to complete an electrolytic capacitor. Specifically, the capacitor element was housed in a bottomed case so that lead wires were positioned on an opening side of the bottomed case. And then a sealing member (an elastic material including a butyl rubber as a rubber component) that was formed so as to allow the lead wires to penetrate the sealing member was disposed above the capacitor element, so that the capacitor element was encapsulated in the bottomed case. The bottomed case was, at a part near an opening end, processed by drawing and was further curled at the opening end, and a base plate was disposed on a curled part to complete electrolytic capacitor (A1) as shown in FIG. 1. Thereafter, an aging treatment was performed at 130° C. for 2 hours while a rated voltage was applied.

Example 2

Except that an electrolytic solution having a composition as shown in Table B below was used, the same procedure as in Example 1 was carried out to prepare electrolytic capacitor A2, and perform evaluation.

TABLE B

| Solvent component | Proportion in solvent |
| --- | --- |
| EG | 80% by mass |
| PEG | 20% by mass |
| Total of solvent component | 100% by mass |
| Proportion of glycol compound in whole solvent | 100% by mass |
| Proportion of EG in glycol compound | 80% by mass |
| Proportion of PEG in glycol compound | 20% by mass |

| Solute component | Proportion of solute contained in electrolytic solution |
| --- | --- |
| Triethylamine | 1.9% by mass |
| o-phthalic acid (second aromatic compound) | 13.1% by mass |
| Pyrogallol (first aromatic compound) | 3% by mass |
| Total of solute component | 18% by mass |
| Proportion of base component in whole solute | 10.6% by mass |
| Proportion of first aromatic compound in whole solute | 16.7% by mass |
| Proportion of second aromatic compound in whole solute | 72.7% by mass |
| Ratio of carboxylic acid component with respect to 100 parts by mass of base component | 686 parts by mass |
| pH of electrolytic solution | 3.59 |

Example 3

Except that an electrolytic solution having a composition as shown in Table C below was used, the same procedure as in Example 1 was carried out to prepare electrolytic capacitor A3, and perform evaluation.

TABLE C

| Solvent component | Proportion in solvent |
| --- | --- |
| EG | 60% by mass |
| PEG | 20% by mass |
| Glycerin | 20% by mass |
| Total of solvent component | 100% by mass |
| Proportion of glycol compound in whole solvent | 80% by mass |
| Proportion of EG in glycol compound | 75% by mass |
| Proportion of PEG in glycol compound | 25% by mass |

| Solute component | Proportion of solute contained in electrolytic solution |
| --- | --- |
| Triethylamine | 3% by mass |
| o-phthalic acid (second aromatic compound) | 12% by mass |
| Pyrogallol (first aromatic compound) | 3% by mass |
| Total of solute component | 18% by mass |
| Proportion of base component to whole solute | 16.7% by mass |
| Proportion of first aromatic compound in whole solute | 16.6% by mass |
| Proportion of second aromatic compound in whole solute | 66.7% by mass |
| Ratio of carboxylic acid component with respect to 100 parts by mass of base component | 399 parts by mass |
| pH of electrolytic solution | 3.68 |

Comparative Example 1

Except that an electrolytic solution having a composition as shown in Table D below was used, the same procedure as in Example 1 was carried out to prepare electrolytic capacitor B1, and perform evaluation.

TABLE D

| Solvent component | Proportion in solvent |
|---|---|
| EG | 60% by mass |
| PEG | 20% by mass |
| Glycerin | 20% by mass |
| Total of solvent component | 100% by mass |
| Proportion of glycol compound in whole solvent | 80% by mass |
| Proportion of EG in glycol compound | 75% by mass |
| Proportion of PEG in glycol compound | 25% by mass |

| Solute component | Proportion of solute contained in electrolytic solution |
|---|---|
| Triethylamine | 5.3% by mass |
| o-phthalic acid (second aromatic compound) | 9.7% by mass |
| Pyrogallol (first aromatic compound) | 3% by mass |
| Total of solute component | 18% by mass |
| Proportion of base component in whole solute | 29.4% by mass |
| Proportion of first aromatic compound in whole solute | 16.6% by mass |
| Proportion of second aromatic compound in whole solute | 54% by mass |
| Ratio of carboxylic acid component with respect to 100 parts by mass of base component | 184 parts by mass |
| pH of electrolytic solution | 4.1 |

Evaluation

Electrostatic capacity, ESR, and a breakdown voltage (BDV) were measured for the resultant electrolytic capacitor. The breakdown voltage (BDV) was defined as a voltage measured when the voltage was applied at an increasing rate of 1.0 V/s and an excess current of 0.5 A flowed.

Further, in order to evaluate long term reliability, the electrolytic capacitor was retained at 125° C. for 5000 hours while a rated voltage was applied, and an increase rate in ESR (ΔESR) was evaluated. The increase rate ΔESR was represented by a ratio $(X/X_0)$ of a value of ESR (X) after retention for 5000 hours to an initial value $(X_0)$. Table 1 shows evaluation results.

TABLE 1

| Electrolytic capacitor | Electrostatic Capacity (μF) | ESR (mΩ) | BDV (V) | $X/X_o$ |
|---|---|---|---|---|
| A1 | 32.2 | 15 | 149 | 1.5 |
| A2 | 32.5 | 17 | 148 | 2.5 |
| A3 | 32.3 | 17 | 148 | 2.8 |
| B1 | 32.1 | 18 | 148 | 278.0 |

Example 4

Except that an electrolytic solution having a composition as shown in Table E below was used, the same procedure as in Example 1 was carried out to prepare electrolytic capacitor A4, and perform evaluation.

TABLE E

| Solvent component | Proportion in solvent |
|---|---|
| EG | 30% by mass |
| PEG | 20% by mass |
| Glycerin | 50% by mass |
| Total of solvent component | 100% by mass |
| Proportion of glycol compound in whole solvent | 50% by mass |
| Proportion of EG in glycol compound | 60% by mass |
| Proportion of PEG in glycol compound | 40% by mass |

| Solute component | Proportion of solute contained in electrolytic solution |
|---|---|
| Triethylamine | 1.1% by mass |
| o-phthalic acid (second aromatic compound) | 13.9% by mass |
| Pyrogallol (first aromatic compound) | 3% by mass |
| Total of solute component | 18% by mass |
| Proportion of base component in whole solute | 6.1% by mass |
| Proportion of first aromatic compound in whole solute | 16.7% by mass |
| Proportion of second aromatic compound in whole solute | 77.2% by mass |
| Ratio of carboxylic acid component with respect to 100 parts by mass of base component | 1266 parts by mass |
| pH of electrolytic solution | 3.51 |

Example 5

Except that an electrolytic solution having a composition as shown in Table F below was used, the same procedure as in Example 1 was carried out to prepare electrolytic capacitor A5, and perform evaluation.

TABLE F

| Solvent component | Proportion in solvent |
|---|---|
| EG | 30% by mass |
| PEG | 20% by mass |
| Glycerin | 50% by mass |
| Total of solvent component | 100% by mass |
| Proportion of glycol compound in whole solvent | 50% by mass |
| Proportion of EG in glycol compound | 60% by mass |
| Proportion of PEG in glycol compound | 40% by mass |

| Solute component | Proportion of solute contained in electrolytic solution |
|---|---|
| Triethylamine | 1.1% by mass |
| o-phthalic acid (second aromatic compound) | 13.9% by mass |
| Pyrogallol (first aromatic compound) | 0% by mass |
| Total of solute component | 15% by mass |
| Proportion of base component in whole solute | 7.3% by mass |
| Proportion of first aromatic compound in whole solute | 0% by mass |
| Proportion of second aromatic compound in whole solute | 92.7% by mass |
| Ratio of carboxylic acid component with respect to 100 parts by mass of base component | 1270 parts by mass |
| pH of electrolytic solution | 3.48 |

Example 6

Except that an electrolytic solution having a composition as shown in Table G below was used, the same procedure as in Example 1 was carried out to prepare electrolytic capacitor A6, and perform evaluation. A part of the carboxylic acid component (pyromellitic acid) and the base component (triethylamine) were added as ditriethylamine pyromellitate (salt).

TABLE G

| Solvent component | Proportion in solvent |
|---|---|
| EG | 30% by mass |
| PEG | 20% by mass |
| Glycerin | 50% by mass |
| Total of solvent component | 100% by mass |
| Proportion of glycol compound in whole solvent | 50% by mass |
| Proportion of EG in glycol compound | 60% by mass |
| Proportion of PEG in glycol compound | 40% by mass |

| Solute component | Proportion of solute contained in electrolytic solution |
|---|---|
| Triethylamine | 1.1% by mass |
| Pyromellitic acid (second aromatic compound) | 13.9% by mass |
| Pyrogallol (first aromatic compound) | 0% by mass |
| Total of solute component | 15% by mass |
| Proportion of base component in whole solute | 7.3% by mass |
| Proportion of first aromatic compound in whole solute | 0% by mass |
| Proportion of second aromatic compound in whole solute | 92.7% by mass |
| Ratio of carboxylic acid component with respect to 100 parts by mass of base component | 1270 parts by mass |
| pH of electrolytic solution | 3.63 |

Example 7

Except that an electrolytic solution having a composition as shown in Table H below was used, the same procedure as in Example 1 was carried out to prepare electrolytic capacitor A7, and perform evaluation.

TABLE H

| Solvent component | Proportion in solvent |
|---|---|
| EG | 80% by mass |
| PEG | 0% by mass |
| Glycerin | 20% by mass |
| Total of solvent component | 100% by mass |
| Proportion of glycol compound in whole solvent | 80% by mass |
| Proportion of EG in glycol compound | 100% by mass |
| Proportion of PEG in glycol compound | 0% by mass |

| Solute component | Proportion of solute contained in electrolytic solution |
|---|---|
| Triethylamine | 1.1% by mass |
| o-phthalic acid (second aromatic compound) | 13.9% by mass |
| Pyrogallol (first aromatic compound) | 3% by mass |
| Total of solute component | 18% by mass |
| Proportion of base component in whole solute | 6.1% by mass |
| Proportion of first aromatic compound in whole solute | 16.7% by mass |
| Proportion of second aromatic compound in whole solute | 77.2% by mass |
| Ratio of carboxylic acid component with respect to 100 parts by mass of base component | 1266 parts by mass |
| pH of electrolytic solution | 3.60 |

Example 8

Except that an electrolytic solution having a composition as shown in Table I below was used, the same procedure as in Example 1 was carried out to prepare electrolytic capacitor A8, and perform evaluation.

TABLE I

| Solvent component | Proportion in solvent |
|---|---|
| EG | 80% by mass |
| PEG | 20% by mass |
| Total of solvent component | 100% by mass |
| Proportion of glycol compound in whole solvent | 100% by mass |
| Proportion of EG in glycol compound | 80% by mass |
| Proportion of PEG in glycol compound | 20% by mass |

| Solute component | Proportion of solute contained in electrolytic solution |
|---|---|
| Triethylamine | 0.15% by mass |
| o-phthalic acid (second aromatic compound) | 1.25% by mass |
| Pyrogallol (first aromatic compound) | 0.6% by mass |
| Total of solute component | 2.0% by mass |
| Proportion of base component in whole solute | 7.5% by mass |
| Proportion of first aromatic compound in whole solute | 30.0% by mass |
| Proportion of second aromatic compound in whole solute | 62.5% by mass |
| Ratio of carboxylic acid component with respect to 100 parts by mass of base component | 833 parts by mass |
| pH of electrolytic solution | 3.71 |

Example 9

Except that an electrolytic solution having a composition as shown in Table J below was used, the same procedure as in Example 1 was carried out to prepare electrolytic capacitor A9, and perform evaluation.

TABLE J

| Solvent component | Proportion in solvent |
|---|---|
| EG | 80% by mass |
| PEG | 20% by mass |
| Total of solvent component | 100% by mass |
| Proportion of glycol compound in whole solvent | 100% by mass |
| Proportion of EG in glycol compound | 80% by mass |
| Proportion of PEG in glycol compound | 20% by mass |

| Solute component | Proportion of solute contained in electrolytic solution |
|---|---|
| Triethylamine | 1.83% by mass |
| o-phthalic acid (second aromatic compound) | 23.17% by mass |
| Pyrogallol (first aromatic compound) | 5% by mass |
| Total of solute component | 30% by mass |
| Proportion of base component in whole solute | 6.1% by mass |
| Proportion of first aromatic compound in whole solute | 16.7% by mass |
| Proportion of second aromatic compound in whole solute | 77.2% by mass |
| Ratio of carboxylic acid component with respect to 100 parts by mass of base component | 1266 parts by mass |
| pH of electrolytic solution | 3.48 |

Table 2 shows evaluation results in Examples 4 to 9.

TABLE 2

| Electrolytic capacitor | Electrostatic Capacity (μF) | ESR (mΩ) | BDV (V) | $X/X_o$ |
| --- | --- | --- | --- | --- |
| A4 | 32.3 | 15 | 149 | 1.7 |
| A5 | 31.8 | 16 | 149 | 2.1 |
| A6 | 32.0 | 15 | 148 | 1.9 |
| A7 | 31.9 | 16 | 149 | 2.0 |
| A8 | 30.8 | 19 | 148 | 2.5 |
| A9 | 31.2 | 18 | 149 | 2.3 |

The present disclosure can be utilized for an electrolytic capacitor that includes a solid electrolyte layer covering at least a part of a dielectric layer, and an electrolytic solution.

What is claimed is:

1. An electrolytic capacitor comprising:
an anode body having a dielectric layer;
a solid electrolyte layer in contact with the dielectric layer of the anode body; and
an electrolytic solution, wherein:
the electrolytic solution contains a solvent and a solute,
the solvent contains a glycol compound,
the solute contains a carboxylic acid component and a base component,
a ratio of the carboxylic acid component in the solute is 200 parts by mass or more with respect to 100 parts by mass of the base component, and
a proportion of the solute contained in the electrolytic solution ranges from 2% by mass to 30% by mass, inclusive.

2. The electrolytic capacitor according to claim 1, wherein the electrolytic solution has a pH of 4 or less.

3. The electrolytic capacitor according to claim 1, wherein a proportion of the glycol compound contained in the solvent is 50% by mass or more.

4. The electrolytic capacitor according to claim 1, wherein the glycol compound contains ethylene glycol.

5. The electrolytic capacitor according to claim 1, wherein a part of the carboxylic acid component is derived from a salt of the carboxylic acid component and the base component.

6. The electrolytic capacitor according to claim 1, wherein the base component is at least one selected from the group consisting of a primary amine, a secondary amine, and a tertiary amine.

7. The electrolytic capacitor according to claim 1, wherein the solute further contains an aromatic compound containing two or more hydroxyl groups.

8. The electrolytic capacitor according to claim 7, wherein the aromatic compound containing two or more hydroxyl groups is at least one selected from the group consisting of catechol and pyrogallol.

9. The electrolytic capacitor according to claim 1, wherein the carboxylic acid component contains an aromatic compound containing two or more carboxyl groups.

10. The electrolytic capacitor according to claim 9, wherein the aromatic compound containing two or more carboxyl groups is at least one selected from the group consisting of o-phthalic acid and pyromellitic acid.

11. The electrolytic capacitor according to claim 1, wherein the solid electrolyte layer is formed by impregnating the dielectric layer with a polymer dispersion containing a liquid component and a conductive polymer dispersed in the liquid component, forming a film that covers at least a part of the dielectric layer, and then volatilizing the liquid component from the film.

12. The electrolytic capacitor according to claim 1, wherein a ratio of the carboxylic acid component in the solute is 600 parts by mass or more with respect to 100 parts by mass of the base component.

13. The electrolytic capacitor according to claim 1, wherein the solvent further contains tri-or-more-hydric alcohol.

14. The electrolytic capacitor according to claim 13, wherein the tri-or-more hydric alcohol contains a glycerin.

15. The electrolytic capacitor according to claim 1, wherein the glycol compound contains at least one selected from the group consisting of diethylene glycol, triethylene glycol, propylene glycol, polyethylene glycol which has an average molecular weight ranging from 190 to 400, inclusive.

16. An electrolytic capacitor comprising:
an anode body having a dielectric layer;
a solid electrolyte layer in contact with the dielectric layer of the anode body; and
an electrolytic solution, wherein:
the electrolytic solution contains a solvent and a solute,
the solvent contains a glycol compound,
the solute contains a carboxylic acid component and a base component,
a ratio of the carboxylic acid component in the solute is 200 parts by mass or more with respect to 100 parts by mass of the base component, and
a part of the carboxylic acid component is derived from a salt of the carboxylic acid component and the base component.

17. The electrolytic capacitor according to claim 16, wherein the electrolytic solution has a pH of 4 or less.

18. The electrolytic capacitor according to claim 16, wherein a proportion of the glycol compound contained in the solvent is 50% by mass or more.

19. The electrolytic capacitor according to claim 16, wherein the glycol compound contains ethylene glycol.

20. The electrolytic capacitor according to claim 16, wherein the base component is at least one selected from the group consisting of a primary amine, a secondary amine, and a tertiary amine.

21. The electrolytic capacitor according to claim 16, wherein the solute further contains an aromatic compound containing two or more hydroxyl groups.

22. The electrolytic capacitor according to claim 21, wherein the aromatic compound containing two or more hydroxyl groups is at least one selected from the group consisting of catechol and pyrogallol.

23. The electrolytic capacitor according to claim 16, wherein the carboxylic acid component contains an aromatic compound containing two or more carboxyl groups.

24. The electrolytic capacitor according to claim 23, wherein the aromatic compound containing two or more carboxyl groups is at least one selected from the group consisting of o-phthalic acid and pyromellitic acid.

25. The electrolytic capacitor according to claim 16, wherein the solid electrolyte layer is formed by impregnating the dielectric layer with a polymer dispersion containing a liquid component and a conductive polymer dispersed in the liquid component, forming a film that covers at least a part of the dielectric layer, and then volatilizing the liquid component from the film.

26. The electrolytic capacitor according to claim 16, wherein a ratio of the carboxylic acid component in the solute is 600 parts by mass or more with respect to 100 parts by mass of the base component.

27. The electrolytic capacitor according to claim 16, wherein the solvent further contains tri-or-more-hydric alcohol.

28. The electrolytic capacitor according to claim 27, wherein the tri-or-more hydric alcohol contains a glycerin.

29. The electrolytic capacitor according to claim 16, wherein the glycol compound contains at least one selected from the group consisting of diethylene glycol, triethylene glycol, propylene glycol, polyethylene glycol which has an average molecular weight ranging from 190 to 400, inclusive.

\* \* \* \* \*